US009104703B2

(12) United States Patent
Yaqub (10) Patent No.: US 9,104,703 B2
(45) Date of Patent: Aug. 11, 2015

(54) CONVERGED PERSONAL AREA NETWORK SERVICE METHOD AND SYSTEM

(75) Inventor: Raziq Yaqub, Stewartsville, NJ (US)

(73) Assignees: TOSHIBA AMERICA RESEARCH, INC., Piscataway, NJ (US); TELECORDIA TECHNOLOGIES, INC., Piscataway, NJ (US)

( * ) Notice: Subject to any disclaimer, the term of this patent is extended or adjusted under 35 U.S.C. 154(b) by 430 days.

(21) Appl. No.: 12/465,027

(22) Filed: May 13, 2009

(65) Prior Publication Data

US 2010/0293183 A1 Nov. 18, 2010

(51) Int. Cl.
G06F 17/30 (2006.01)

(52) U.S. Cl.
CPC ...... *G06F 17/30265* (2013.01); *G06F 17/3028* (2013.01)

(58) Field of Classification Search
USPC .................................................. 707/915, 951
See application file for complete search history.

(56) References Cited

U.S. PATENT DOCUMENTS

| 6,804,684 | B2 * | 10/2004 | Stubler et al. .......................... 1/1 |
| 7,636,733 | B1 * | 12/2009 | Rothmuller ................... 382/305 |
| 2003/0051207 | A1 * | 3/2003 | Kobayashi et al. ........... 715/500 |
| 2005/0225643 | A1 * | 10/2005 | Grignani .................. 348/207.99 |
| 2005/0289469 | A1 | 12/2005 | Chandler et al. |
| 2006/0224048 | A1 | 10/2006 | Devaul et al. |
| 2006/0253491 | A1 * | 11/2006 | Gokturk et al. ............. 707/104.1 |
| 2008/0071798 | A1 * | 3/2008 | Ferguson et al. ................ 707/10 |
| 2008/0132251 | A1 | 6/2008 | Altman et al. |
| 2009/0077030 | A1 * | 3/2009 | Lee .................................... 707/3 |
| 2009/0089249 | A1 * | 4/2009 | Verosub et al. ................... 707/3 |

OTHER PUBLICATIONS

International Search Report and Written Opinion of PCT/US10/34776, date of mailing Jul. 13, 2010.

\* cited by examiner

*Primary Examiner* — Albert Phillips, III
(74) *Attorney, Agent, or Firm* — Westerman, Hattori, Daniels & Adrian, LLP (57) ABSTRACT

A converged personal area network service system uses information provided by personal network elements (PNEs) to generate an event report file to store along with a data file to commemorate an event. When the data file is created, such as taking a picture, an event recording device sends requests to PNEs, sensors and other devices within the network to provide information corresponding to a timestamp based on the event. The information, if available, is sent to the event recording device, where it is aggregated. The event recording device generates an event report file that includes fields storing the information pertaining to the data file. The event report file is stored along with the data file for retrieval or use at a later time.

8 Claims, 8 Drawing Sheets

CONVERGED PERSONAL AREA NETWORK SERVICE METHOD AND SYSTEM

FIELD OF THE INVENTION

The present invention relates to using personal area network elements to gather and store information. More particularly, the present invention relates to using the personal area network elements to gather and store information within a network as an event report file using an event recording device.

DISCUSSION OF THE RELATED ART

Mobile and handheld wireless devices are part of everyday life. These devices serve as phones, cameras, global positioning satellite (GPS) locators, music libraries, computers and the like. A user may store vast amounts of information on different devices, which does not lend itself to compiling the information for a specific event or action. Further using one device to store and process all the information may inhibit the mobility and usefulness of the device by draining power.

For example, GPS receivers are widely available in handheld devices, such as phones, car navigation systems, and even cameras, due to low cost. Battery drain from use of the receiver, however, is a concern. A GPS receiver attached to a car battery or alternating current (AC) source does not face battery drain problems, but within a handheld or mobile device, power usage is a serious concern.

Further, when taking a picture, the time required to take the picture typically is less than the time required to turn on and synchronize the GPS receiver with the GPS satellite. Sometimes, little or no GPS coverage is available. Thus, desired information, such as location, from the GPS receiver may not be available or feasible. Other information applicable to the picture, such as personal information or contact information to participants, may not be readily available to the camera.

SUMMARY OF THE INVENTION

The disclosed embodiments collect worthwhile available information from personal area network elements (PNEs) regarding an event. An event recording device (ERD) according to the disclosed embodiments aggregates the collected information to prepare an event report file (ERF) and stores the ERF at a desired location within the device or the network. The stored information benefits for families and friends but also for news and law enforcement agencies.

Thus, the disclosed embodiments recite a converged personal area network service system. The converged personal area network service system includes at least one personal network element able to communicate over a network. The converged personal area network service also includes an event recording device residing within the network to collect requested information from the at least one personal network element pertaining to a data file created by one of the at least one personal network element. The converged personal area network service system also includes an event report file generated by the event recording device using the requested information. The event report file includes fields storing information corresponding to the data file. The converged personal area network service system also includes a storage device within the network that stores the data file and the event report file.

According to the disclosed embodiments, a method for providing converged personal area network service within a network is recited. The method includes creating a data file corresponding to an event. The method also includes collecting information corresponding to the event from at least one personal network element within the network by an event recording device. The method also includes generating an event report file by the event recording device using the collected information. The method also includes storing the data file and the event report file in a storage device within the network.

Further according to the disclosed embodiments, a method for collecting and storing information for a data file using a network. The method includes performing an action related to an event, wherein the action generates a data file. The method also includes preparing a timestamp corresponding to the event when the action is performed. The method also includes sending a request to a personal network element from an event recording device within the network, wherein the request includes the timestamp. The method also includes retrieving information corresponding to the timestamp at the personal network element. The method also includes receiving the information at the event recording device. The method also includes generating an event report file by the event recording device, wherein the event report file includes the information in a field. The method also includes storing the event report file and the data file in a storage device within the network.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed in the claims.

DETAILED DESCRIPTION OF THE PREFERRED EMBODIMENTS

Reference will now be made in detail to the preferred embodiments of the present invention. Examples of the preferred embodiments are illustrated in the accompanying drawings.

Figure 1:
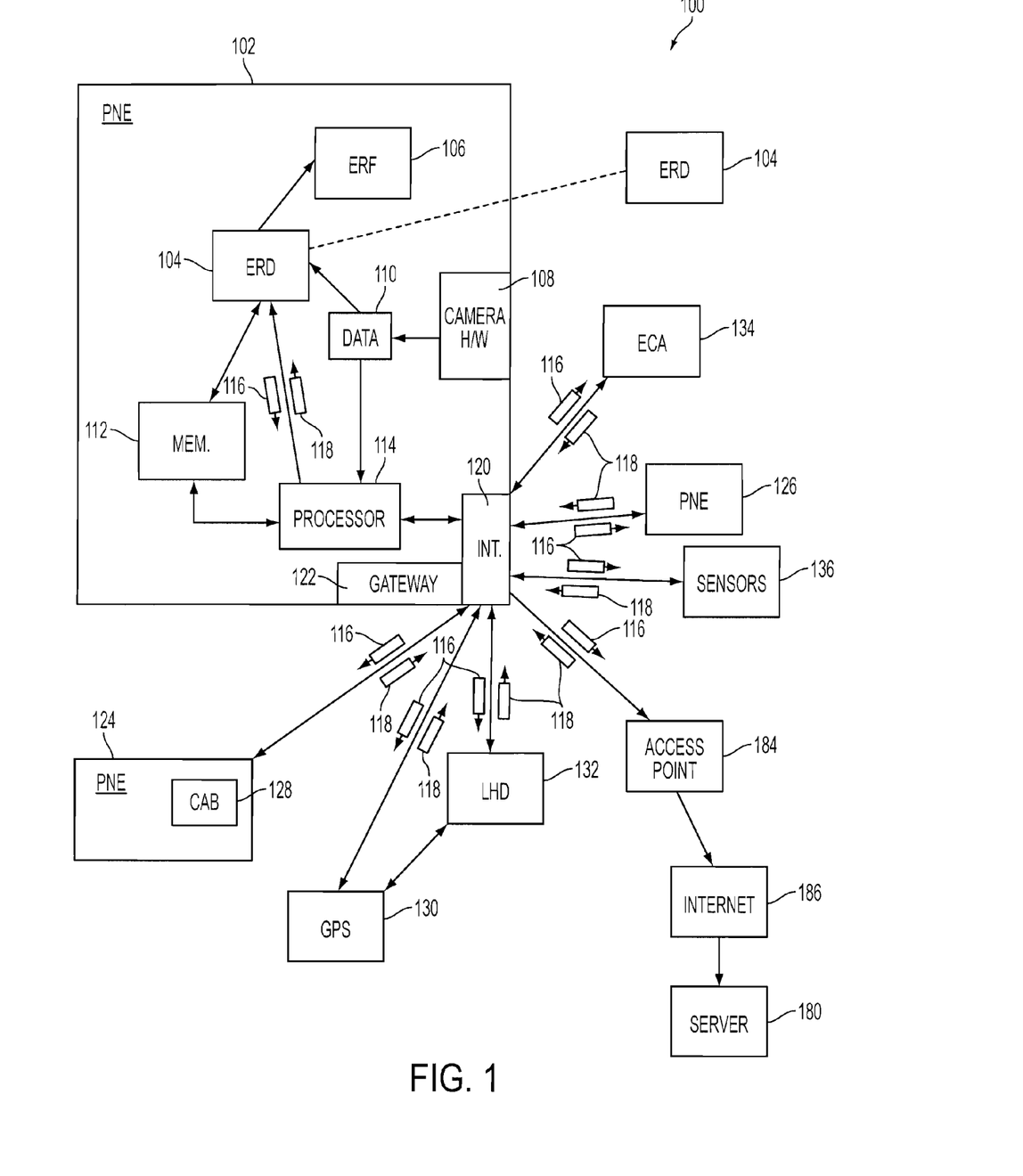
FIG. 1 illustrates a personal area network service system having personal area network elements according to the disclosed embodiments.

FIG. 1 depicts a network 100 having personal area network elements (PNEs) according to the disclosed embodiments. Network 100 may be referred to as a personal area network service system. PNEs also may be referred to as devices, and include any sort of mobile and handheld devices and computers. PNEs have the capability of communicating with each other within network 100, either directly or indirectly through gateways over a wireless personal area network (WPAN), wireless local area network (WLAN), or wide area network (WAN).

Network 100 includes PNE 102. PNE 102 includes a processor 114 that executes steps stored in memory 112. PNE 102 also includes event recording device (ERD) 104 that prepares or generates event report file (ERF) 106. In one embodiment, ERD 104 is on PNE 102. Alternatively, ERD 104 may be located elsewhere within network 100 but accessible by PNE 102.

For example, PNE 102 may be a handheld camera. In this example, PNE 102 may include a camera hardware 108 that takes a picture, or a data file 110. PNE 102 may include other devices or hardware for other functions, such as a mobile phone. Processor 114 may execute commands to operate camera hardware 108 and store data file 110 in memory 112. Processor 114 also may execute commands given to it by ERD 104.

Further, PNE 102 collects and records context information related to the picture within data file 110 that can make the picture even more interesting. The context information may include the event nature, event location, event participants and the like. This information may be stored in ERF 106. Thus, according to the disclosed embodiments, PNE 102 gathers information from other PNEs and resources in network 100.

In the example given above, PNE 102 may be a digital camera having the capability of communicating with other PNEs, such as PNE 124 and 126. PNEs may include phones, personal digital assistants, navigation systems, laptop computers, MP3 players, remote server and the like.

PNE 102 communicates with the other devices using a wireless interface 120. PNE 102 may communicate with server 180 via an access point 184 over internet connection 186. PNE 102 may store information on server 180 via this route when access point 184 is available.

Other elements within network 100 include PNE 124. PNE 124 may be a laptop or other device including converged address book (CAB) 128. GPS 130 may be in a GPS device, another PNE or in a vehicle. Network 100 also includes a location history database (LHD) 132 that receives information from GPS 130. LHD 132 is disclosed in greater detail below.

Network 100 also includes one or more sensors 136 that record or determine ambient or health conditions that are of interest to ERD 104. Sensors 136 also may reside in other PNEs or stand alone. Electronic calendar application (ECA) 134 stores information regarding the user's schedule, events, tasks and the like. ECA 134 also may reside in a PNE, such as a computer.

Communication between elements in network 100 occurs by sending a request 116 that includes a timestamp for the event to create data file 110. Once the element receives a request 116, it compiles and forwards the information to ERD 104. The processes for gathering the information to place in ERF 106 are disclosed in greater detail below.

Figure 2:
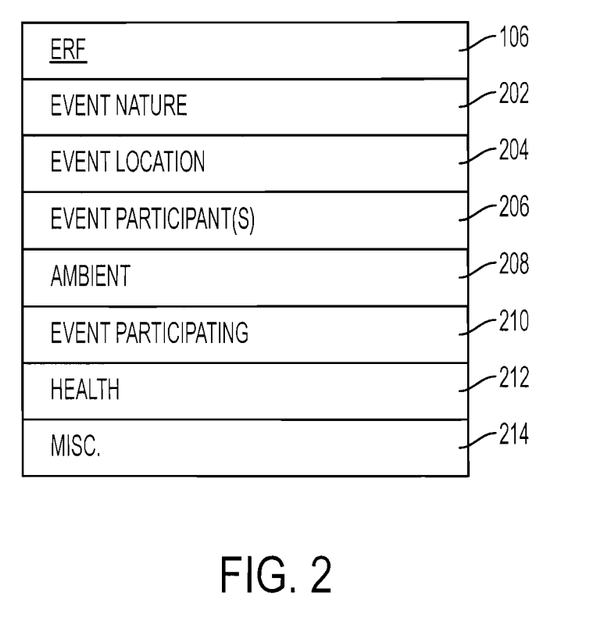
FIG. 2 illustrates a block diagram of the fields comprising an event report file according to the disclosed embodiments.

FIG. 2 depicts a block diagram of the fields comprising ERF 106 according to the disclosed embodiments. ERF 106 enhances the experience associated with taking a picture, such as data file 110. The disclosed embodiments using ERD 102 collects or gathers context information related to the picture of data file 110 from the PNEs and other elements in network 100. ERD 104 then saves ERF 106 either in PNE 102 or in any location within network 100.

ERF 106 includes several fields to store the collected context information. ERF 106, however, is not limited to these fields and may include other fields for different information as desired. ERF 106 also may not include all the fields disclosed below. Each field may correspond to a process to collect the specific information to be stored in ERF 106.

Event nature information field 202 stores event nature information, such as meeting, wedding, birthday and the like, fetched from a schedule/calendar stored electronically in PNE 102 or another PNE within network 100, such as PNEs 124 or 126. Devices applicable to storing this information includes personal digital assistants, cell or mobile phones, laptop or desktop computers, network devices or servers, any communication device and the like.

Event location information field 204 stores event location information, such as GPS coordinates, addresses, or any geographical location. Event location information is fetched from LHD 132. LHD 132 imports geo-coordinates from any PNE that is GPS-enabled. For illustrative purposes, GPS 130 is shown separately in network 100. The geo-coordinates are imported at regular intervals. LHD 132, based on memory capacity, may keep this data from some predetermined period of time and may delete the oldest data with new data received from GPS 130, in a first in, first out sequence.

LHD 132 also includes a device activities log mapped with time and location. The device activities log may be stored in LHD 132. The device activities log may include the available PNEs' identifications (for example, PNE 102 may have a unique identifier within network 100). The identifications may correspond to the internet protocol address. The device activities log also stores the activities of the different PNEs. These activities include PNE registration, deregistration, peering, successful/unsuccessful authentication, and the like. LHD 132 also may be stored on any PNE within network 100, such as PNE 102.

Event participant(s) information field 206 stores event participants' personal information, such as names, addresses, email addresses, numbers and the like. ERD 104 fetches this information from CAB 128. CAB 128 not only includes contact information, but also includes personal contact cards (PCC). Using contact views, defined by the CAB user, CAB 128 is able to provide different subsets of this information to other users requesting such contact information. CAB 128 may be stored in a phone or its replica within network 100. For illustrative purposes only, CAB 128 is shown within PNE 124.

Ambient information field 208 stores ambient information, such as weather conditions, temperature, humidity, rainfall, sunlight, and the like. ERD 104 may fetch the ambient information from a qualified PNE or weather server, or any other source capable of providing ambient information, such as sensors 136.

Event participating devices information field 210 stores information pertaining to PNE 102 and camera 108, such as name/model number. ERD 104 may fetch the information about the devices that participated in the event or contributed to generate ERF 106. This information may be obtained directly from the PNEs within network 100 or from LHD 132.

Health information field 212 stores health information of the participants of the event. The picture of data file 110 includes one or more people, and health information might be of interested to medical organizations and personnel. This information is applicable for a patient. ERD 104 fetches the health information from sensors 136 or files stored within network 100, such as files on server 180.

Miscellaneous information field 214 stores any other information that might be of interest for ERF 106. Miscellaneous information may include additional email addresses of close relatives having an interest in the picture and to whom it may be sent automatically. This information also could be the IP address of the digital picture frame/display/television that receives the picture to display automatically. A copy of the desired picture could be sent along with ERF 106 to the location without any efforts of the recipient.

Miscellaneous information also may include the IP address of any fixed or mobile device or a digital diary or folder on a PNE for the user's record keeping. The digital diary may reside in network 100 or in a local device, such as a PNE. The information also may include the IP address of storage (local or remote) where the picture of data file 110 is stored in the case when local memory, such as memory 112, reaches a certain threshold.

Figure 3:
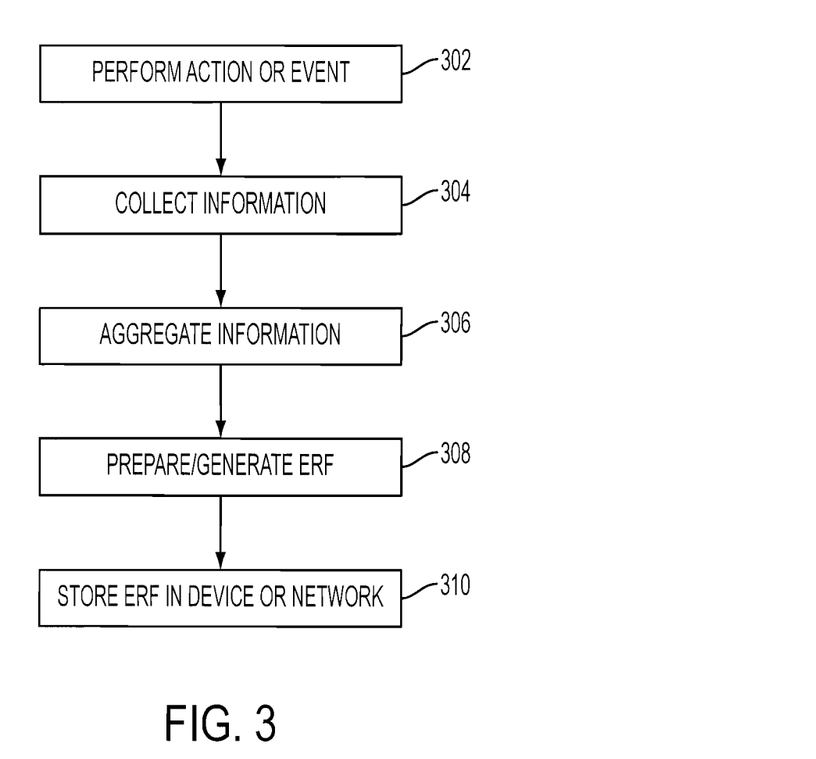
FIG. 3 illustrates a flowchart for collecting information and generating an event report file according to the disclosed embodiments.

FIG. 3 depicts a flowchart for collecting information and generating ERF 106 according to the disclosed embodiments. As disclosed above, ERF 106 may be of interest for receiving a data file created by a PNE within network 100. ERD 104 prepares or generates ERF 106 by contacting other PNEs to collect useful information required for ERF 106. ERF 106 is stored either locally in ERD 104 or at any predetermined device. Alternatively, ERF 106 may be stored remotely in network 100 through gateway functionality.

Using the above example of a picture taking event, ERD 104 is within a camera that creates images, such as data file 110, with camera hardware 108. ERD 104 contacts other elements within network 100 having communication ability to gather the pertinent information.

As shown in FIG. 1, ERD 104 may not reside in PNE 102, but may be another element within network 100. In other words, data file 110 is created using PNE 102, and ERD 104 compiles the information for ERF 106 elsewhere. ERD 104 still associates ERF 106 with data file 110.

Step 302 executes by performing an action or event to create data. Using the above example, a picture or image is created in the form of data file 110. Step 304 executes by collecting information from the other PNEs and elements in network 100 by ERD 104. These processes are disclosed in greater detail below. The information collected may be worthwhile available information and not random information available on network 100.

Step 306 executes by aggregating the collected information in ERD 104. ERD 104 sends requests 116 to the various elements in network 100 to receive information. The elements respond to the requests by sending the information, or, in some instances, keeping the information until it can be sent within network 100. For example, PNE 124 is unable to send the requested information to PNE 102 and ERD 104. PNE 124 may wait until its communication abilities are online to send information 118.

Step 308 executes by preparing and generating ERF 106. ERD 104 places the received information from the PNEs and other elements in the appropriate fields, as disclosed in greater detail below. If information is not available, then ERD 104 may note this fact. ERD 104 also may wait for a period of time to receive the information before preparing ERF 106. In other words, the information may be received by ERD 104 by getting a response on a real time basis or non-real time basis.

Step 310 executes by storing ERF 106 in PNE 102 or another element within network 100. The storage location may be memory 112 in PNE 102, a memory on PNE 124 or 126, or server 180. Further, if ERD 104 is located outside PNE 102, then ERF 106 may be stored at that location. ERF 106 then is accessible to be sent to the other PNEs or elements within network 100 along with data file 110.

Figure 4:
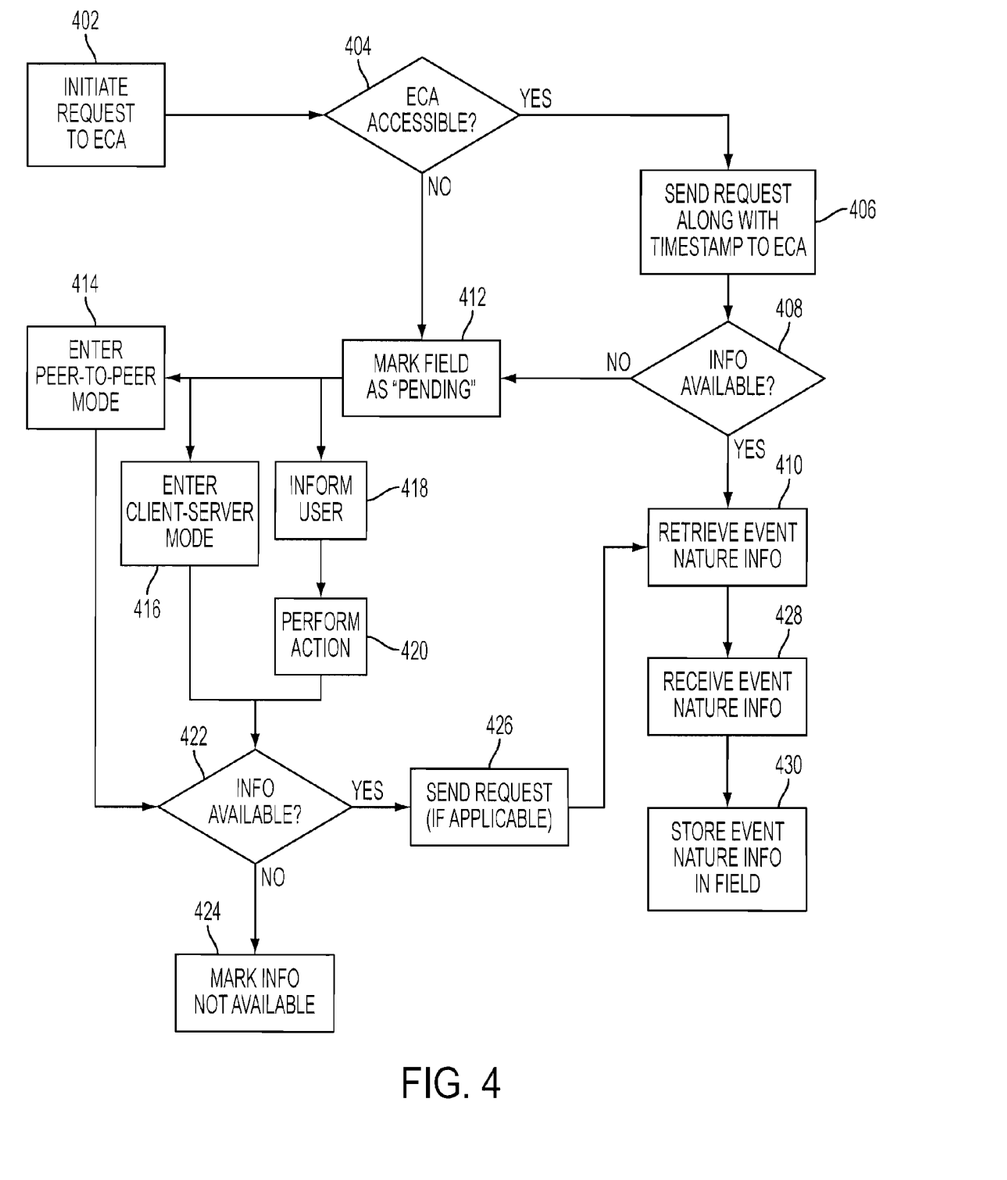
FIG. 4 illustrates a flowchart for collecting and storing event nature information in event report file according to the disclosed embodiments.

FIG. 4 depicts a flowchart for collecting and storing event nature information in ERF 106 according to the disclosed embodiments. As disclosed above, a user of PNE 102 may store information regarding schedule, events, tasks and the like in ECA 134. ECA stands for electronic calendar application. ECA 134 may reside in PNE 102 or elsewhere in network 100. The information may be stored manually by the user, or automatically retrieved via synch software installed on the device or element.

This information is sent as event nature information to ERD 104 and stored in field 202 of ERF 106. ERD 104 fetches the event nature information from ECA 134. More specifically, ERD 104 sends request 116 having a timestamp to ECA 134 and ask what event nature information is recorded or stored which corresponds to the timestamp.

Using the picture taking example, the timestamp corresponds to the instant camera hardware 108 creates data file 110, such as when the record button is pushed. This timestamp is sent with request 116 from ERD 104 to ECA 134. ECA 134, in response to request 116, would send the event nature information associated with the time indicated by the timestamp.

For example, ECA 134 may include event nature information for a wedding for Bob and Alice at a country club located at 3 Tower Center Boulevard, East Brunswick, N.J., United States 08816. Another example may be a business meeting at an intercontinental hotel in Budapest Hungary. This information is associated with the periods of time set aside for the event in ECA 134.

Referring to FIG. 4, step 402 executes by initiating a request to ECA 134 by ERD 104. PNE 102 takes a picture or creates data file 110, and ERD 104 prepares a request with the timestamp. Step 404 executes by determining whether ECA 134 is accessible by PNE 102 and ERD 104. ECA 134 may not be accessible for a variety of reasons, such as being out of network 100 or not communicating. If ECA 134 is not accessible over network 100, then information 118 will not be sent in a real time mode.

If step 404 is yes, then step 406 executes by sending request 116 along with the timestamp to ECA 134 in real time, or at the time the event took place, such as when the picture was taken to create data file 110. ERD 104 sends request 116 to ECA 134.

Step 408 executes by determining whether the requested event nature information is available at ECA 134. This scenario may occur when ECA 134 could not provide the information right away or is not able to communicate via network 100 after receipt of request 116. For example, the device or element hosting ECA 134 may be turned off before it is able to transmit information 118.

If step 408 is yes, then step 410 executes by retrieving the event nature information from ECA 134 based on the timestamp within request 116. In other words, ECA 134 checks for any events corresponding to the timestamp that could serve as event nature information.

If step 404 or step 408 is no, then step 412 executes by marking event nature information field 202 as "information pending." Thus, ERD 104 marks the field in ERF 106 and proceeds with the rest of the collecting process. Further, ERD 104 sustains the request and then performs one or more of steps 414-20. These steps serve to follow up with ECA 134 in case it becomes accessible or the information becomes available.

Step 414 executes by entering peer-to-peer mode of operation. ERD 104, in peer-to-peer mode, sends recurrent reminder queries at predetermined time intervals to ECA 134. For example, ERD 104 may send queries every 5 minutes to see if ECA 134 is available. If a query indicates accessibility, then the information request operations may be completed.

Step 416 executes by entering client-server mode of operation. In client-server mode, ERD 104 registers request 116 with gateway 122 and has gateway 122 watches for the availability/accessibility of ECA 134 or the PNE hosting ECA 134. When ECA 134 becomes available, then the information request operations may be completed.

Step 418 executes by informing the user and possibly asking the user what action should be taken. This step prevents generation of ERF 106 from being held up due to the unavailability of the event nature information if ERF 106 is needed immediately. Step 420 executes by performing an action specified by the user. Actions performed include making ECA 134 accessible or entering the event nature information by the user. Other actions include commanding ERD 104 to keep request 116 pending for some predetermined time period or having ERD 104 leave field 202 in ERF 106 blank.

Step 422 executes by determining whether the event nature information becomes available or bypassed using one or more of steps 414-20. Step 422 may execute a number of times or for a predetermined time period before stopping and determining whether the information is available.

If after a time period or number of actions and step 422 is still no, then step 424 execute by marking event nature information field 202 with "event nature information not available." This may be done automatically by ERD 104 or by user command. Step 424 allows the ERF information collection to continue without undue delay.

If step 422 is yes for any reason, then step 426 may execute by sending request 116 to ECA 134, if necessary. If step 406 was not executed above, then step 422 may complete the information request operations by sending request 116. Alternatively, ERD 104 may resend request 116 for redundancy to make sure ECA 134 receives it. The flowchart then executes step 410, as disclosed above.

Step 428 executes by receiving information 118 at ERD 104. Information 118 includes the requested event nature information. Step 430 executes by storing the event nature information within event nature information field 202 of ERF 106.

Figure 5:
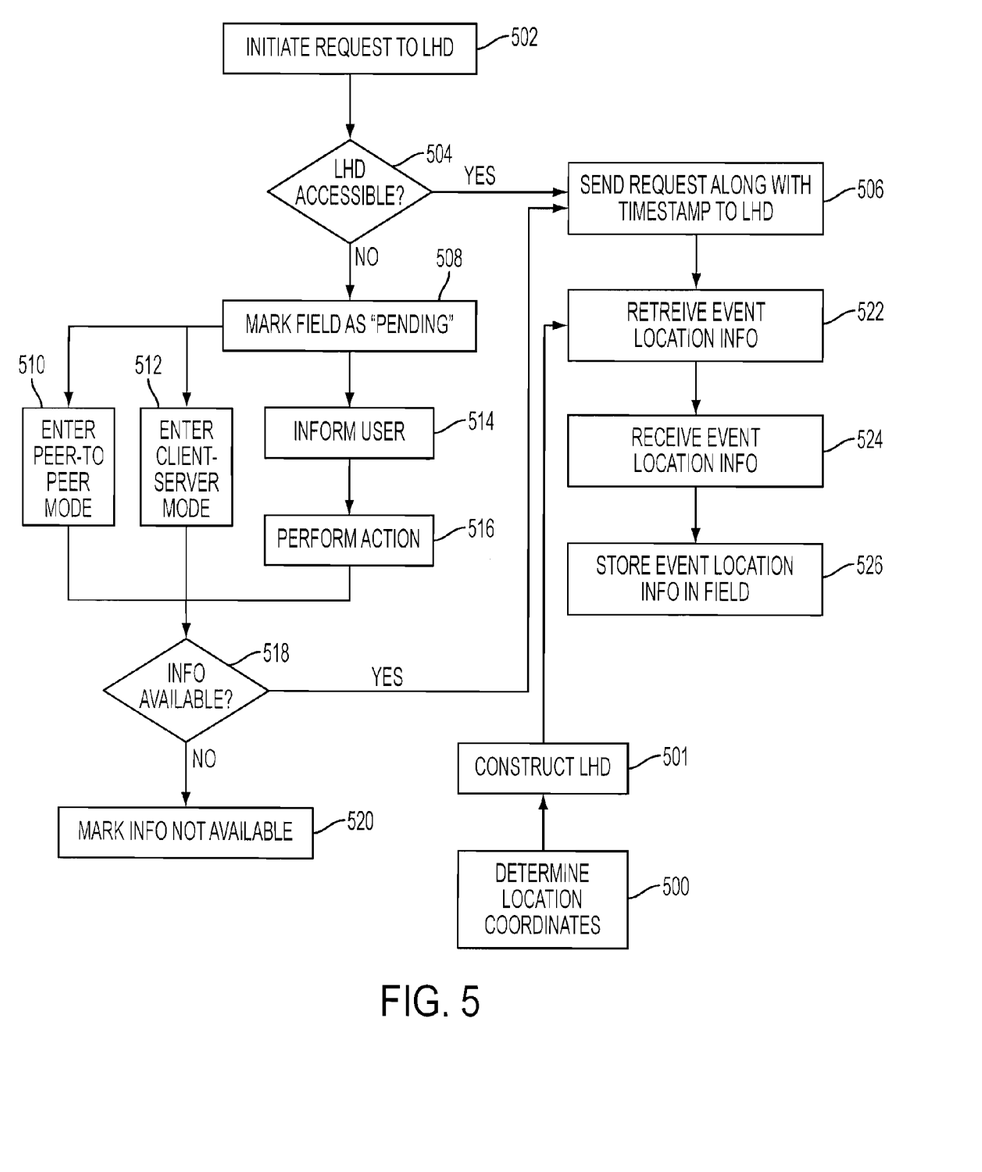
FIG. 5 illustrates a flowchart for collecting and storing event location information in an event report file according to the disclosed embodiments.

FIG. 5 depicts a flowchart for collecting and storing event location information in ERF 106 according to the disclosed embodiments. ERD 104 collects event location information with the help of LHD 132 and GPS 130. The interaction between these entities is disclosed below with regard to steps 500 and 501.

Step 500 executes by determining location coordinates using GPS 130. GPS 130, depending on power availability or other constraints, may take measurements periodically to determine the location of PNE 102, if housed therein, or just itself. Step 501 executes by constructing LHD 132 using the determined coordinates from GPS 130.

Referring back to FIG. 1, LHD 132 is constructed with the help of GPS 130. GPS 130 may be integrated in PNE 102, another mobile device or element within network 100, stand alone, and the like. If so, then GPS 130 is operated on a battery that could be drained quickly by continuous GPS use. Thus, GPS 130 may wake up at predetermined intervals to measure the location coordinates for step 500. GPS 130 then reports the coordinates to LHD 132 and goes back to sleep or inactive status.

If GPS 130 is connected to a more permanent power source, such as a vehicle, then it may wake up more frequently or continuously and measure location coordinates more frequently. GPS 130, therefore, may operate in more than one mode depending on whether it is coupled to a fixed or mobile power source.

LHD 132 serves as a database that stores the location coordinates along with a timestamp for when the coordinates were determined. Using the coordinates, LHD 132 is constructed. LHD 132 may be created and stored on any PNE, including PNE 102, within network 100. The location of the user at any specified time may be retrieved from LHD 132 by any authorized PNE.

Another reason for having GPS 130 not update LHD 132 so often in a mobile setting is that the user will normally be stationary or moving slowly, such as a pedestrian. Thus, the location coordinates should not change as rapidly as if the user was in a vehicle. Frequency of determining location coordinates while in a vehicle may be increased as location changes more often.

LHD 132 may include instances where no location information is available from GPS 130 or corrupted in storage. LHD 132 then may use statistical tools, like interpolation, estimation, regression and the like, to estimate the location coordinates corresponding to the unavailable time. An estimated location may be good enough for applications not requiring precise or pin-point location coordinates. Using the Bob and Alice wedding example from above, the location coordinates probably would not change or vary much if an entry was missing in LHD 132 for a time period corresponding to the wedding. In a worst case, LHD 132 could provide the location of the wedding by city, such as East Brunswick, N.J.

Like event nature information, ERD 104 fetches the event location information from LHD 132 to enter into event location information field 204. More specifically, ERD 104 would send a request 116 with a timestamp to LHD 132 and request the event location information corresponding to the timestamp. For example, using the picture taking event, the timestamp would be when the record button is pushed on PNE 102 to activate camera hardware 108. The event location information sent to ERD 104 corresponds to the time stamp.

Referring to FIG. 5, step 502 executes by initiating request 116 along with a timestamp to LHD 132 by ERD 104 in response to some event in PNE 102, such as taking a picture. Step 504 executes by determining whether LHD 132 is accessible over network 100.

If step 504 is yes, then step 506 executes by sending request 116 along with a timestamp to LHD 132 over network 100. Request 116 is send in real time to LHD 132 directly or to a PNE housing LHD 132. This occurs if LHD 132 or its PNE is active, reachable and containing the event location information. If LHD 132 is within PNE 102, then ERD 104 can send request 116 directly without going over network 100.

If step 504 is no, then step 508 executes by marking event location information field 204 as "information pending." Thus, ERD 104 marks the field in ERF 106 and proceeds with the rest of the collecting process. Further, ERD 104 sustains the request and then performs one or more of steps 510-16. These steps serve to follow up with LHD 132 in case it becomes accessible or the information becomes available.

This scenario may occur when LHD 132 or the PNE hosting it is not accessible when the event occurred. Using the picture taking example, if the PNE hosting LHD 132 is in a vehicle, then LHD 132 becomes accessible when the user returns to the vehicle. Until the user returns to the vehicle, event location information field 204 is marked with information pending.

Step 510 executes by entering peer-to-peer mode, as disclosed above. ERD 104 may send queries to LHD 132 at a predetermined time interval for a period of time.

Step 512 executes by entering client-server mode, as disclosed above. ERD 104 registers request 116 with gateway 122 to monitor accessibility/availability of LHD 132 or any PNE hosting LHD 132. If LHD 132 becomes available, then gateway 122 may send request 116 for the event location information.

Step 514 executes by informing the user of the unavailability of LHD 132. The user may be prompted to take action. Thus, step 516 executes by performing the action. The action includes making LHD 132 accessible, instructing ERD 104 to keep request 116 pending for some period of time, or having ERD 104 leaving field 204 blank to proceed with preparing ERF 106. Further, the user may enter the event location information manually or from another application/PNE, such as ECA 134.

Step 518 determines whether the event location information is available to ERD 104. ERD 104 may perform one or more steps 510-16 for a predetermined time period. If after that period LHD 132 is still not accessible or the information is unavailable, then ERD 104 suspends collecting the information to move on. If step 518 is no, then step 520 executes by marking event location information field 204 with "event location information not available." This step may be done automatically or with user consent.

If step 518 is yes, then step 506 is executed, as disclosed above. LHD is accessible so request 116 along with the timestamp is sent. Step 522 executes by retrieving the event location information corresponding to the timestamp in LHD 132. The location coordinates of the timestamp are placed as the event location information.

Step 524 executes by receiving the event location information at ERD 106. Step 526 executes by storing the event location information from LHD 132 in event location information field 204 of ERF 106.

LHD 132 may store a devices activities log mapped with time and location for each device within network 100. Thus, all PNEs and not just PNE 102 may construct a database with time and locations from GPS 130. The devices activities log may include identifications for available PNEs (IP addresses, etc.) and their activities, such as PNE registration, deregistration, peering, successful/unsuccessful authentication, and the like.

Figure 6:
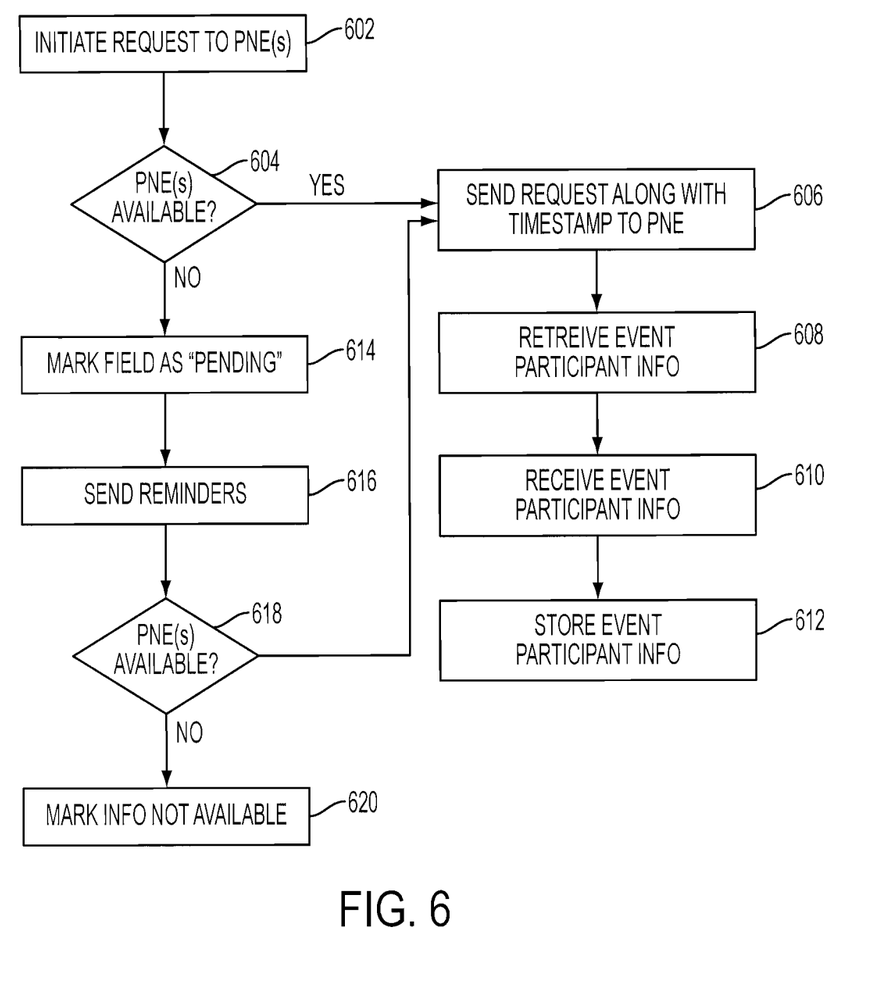
FIG. 6 illustrates a flowchart for collecting and storing event participant information in an event report file according to the disclosed embodiments.

FIG. 6 depicts a flowchart for collecting and storing event participant information in ERF 106 according to the disclosed embodiments. The term "event participant" is used even though more than one participant may be involved in the event. Using the picture taking example, more than one participant may be in the picture. Thus, participant may refer to one or more participants.

To collect event participant information, ERD 104 sends a request 116 along with the timestamp to CAB 128, which is shown as residing on PNE 124. CAB 128 may include the user's personal and business information. This information may be stored in a personal contact card by the user. CAB 128 may reside in PNE 124 or PNE 102, or anyplace within network 100. ERD 104 fetches the personal or business information from CAB 128 and the personal contact card.

More specifically, ERD 104 searches and discovers PNE(s) in a certain zone. ERD 104 may do so directly or assisted by gateway 122. ERD 104 then sends request 116 along with the timestamp to the PNE(s) to fetch participant information. For example, the timestamp for taking the picture is sent to PNE(s) of participants in the picture. For the wedding, friends of Bob and Alice may be in the picture and have their mobile phones with information on them. ERD 104 would fetch this information for ERF 106.

Step 602 executes by initiating request 116 to at least one PN) in the vicinity of PNE 102. Step 604 executes by determining whether the at least one PNE is available/accessible. If yes, then step 606 executes by sending request 116 along with the timestamp to the PNE, such as PNE 124, in real time, or when the event took place.

Step 608 executes by retrieving the event participant information from the PNE. Referring to PNE 124, this device would extract all or part of the information from its personal contact card to send as event participant information. The timestamp may indicate which profile is active for that time. For example, PNE 124 may include a personal profile and a business profile. The information retrieved corresponds to the profile given at the time of the timestamp. The business profile may include work address, email and office phone, while the personal profile may include home address, personal email and home phone. CAB 128 may advertise the appropriate profile.

Step 610 executes by receiving the event participant information as information 118 from PNE 124 to ERD 104. Step 612 executes by storing the event participant information for the user of PNE 124 in event participant(s) information field 206. Because there may be multiple participants, field 206 may include multiple entries for ERF 106.

If step 604 is no, then step 614 executes by marking event participant(s) information field as "information pending." This action allows ERD 104 to proceed with collecting other information from other PNEs without undue delay. Step 616 executes by sending reminders from ERD 104 to the identified PNEs at predetermined intervals to send the event participant information. The period of time may correspond with the length of the event or a user defined limit. Further, reminders may stop once the identified PNE moves out of the vicinity.

Step 618 executes by determining whether the PNE or PNEs become available. If yes, then step 606 is executed to send request 116. If no, then step 620 executes by marking the PNE as "event participant's information not available" for that PNE in event participant(s) information field 206.

If ERD 104 is capable of detecting the precise location of the event participant, then, using the picture taking example, ERD 104 may include the information of the person taking the picture using PNE 102. This information may be handy in sending a thank you note via email.

Figure 7:
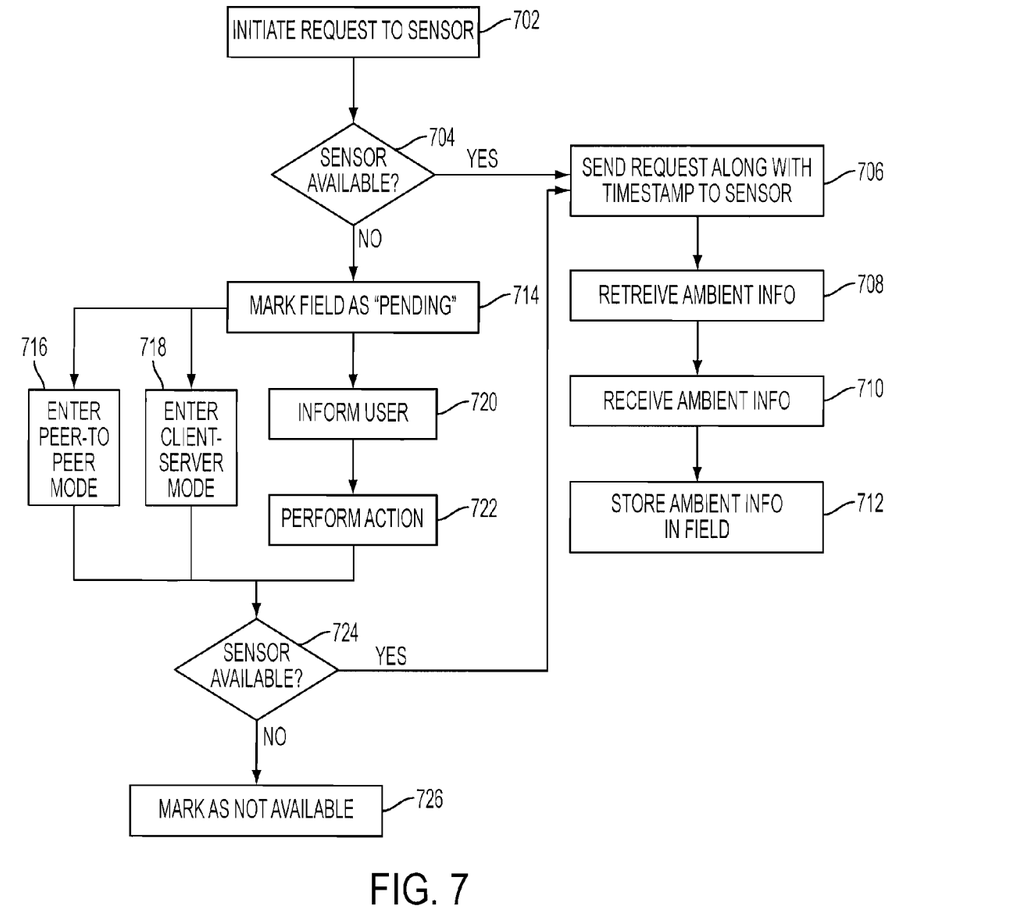
FIG. 7 illustrates a flowchart for collecting and storing ambient information in an event report file according to the disclosed embodiments.

FIG. 7 depicts a flowchart for collecting and storing ambient information in ERF 106 according to the disclosed embodiments. Ambient information includes weather conditions, humidity, precipitation, or any information related to weather, that can be collected from a server storing weather information or predefined/authorized PNE(s)/sensors. Many sources can provide ambient information and these sources may provide the information if they are accessible by ERD 104.

Due to low cost and maintenance, sensors, such as sensors 136 in FIG. 1, are proliferating and are widely integrated in handheld and mobile devices. The sensors usually keep a log history of weather conditions at specified times and report the detected information to a central/local server, such as server 180 in FIG. 1.

Thus, an ambient condition at any specific time may be retrieved from sensors 136 or server 180 and placed in ambient information field 208 of ERF 106. If sensors 136 or server 180 do not have the appropriate information for the specified time, then it may estimate using statistical method, such as interpolation. Thus, estimated ambient information may be determined and used.

Sensors 136 may be located on PNEs, such as PNEs 124 and 126, or even PNE 102. Sensors 136 may be located as a group or individually. Preferably, sensors 136 communicate wirelessly within network 100, either on their own or using PNE configuration.

Referring to FIG. 7, step 702 executes by initiating request 116 from ERD 104 to one of sensors 136. Request 116 also may be initiated to more than one sensor, but only one is discussed here for clarity. The disclosed embodiments, however, are not so limited.

Step 704 executes by determining whether the sensor of sensors 136 is available or accessible. ERD 104 determines if the sensor if accessible within PNE 102 or within network 100. If yes, then step 706 executes by sending request 116 along with the timestamp to the sensor. Specifically, ERD 104 sends request 116 with the timestamp corresponding to the time for the picture taking event in the example above. ERD 104 seeks to fetch the ambient information available corresponding to the timestamp.

Step 708 executes by retrieving the ambient information from the sensor or from another location, such as server 180. The retrieved ambient information reflects the conditions when the picture was taken. The sensor then sends information 118 to ERD 104. Step 710 executes by receiving the ambient information at ERD 104. Step 712 executes by storing the ambient information in ambient information field 208 of ERF 106.

If step 704 is no, then step 714 executes by marking ambient information field 208 as "information pending." As disclosed above, this marking allows ERD 104 to proceed with collecting information. Plus, ERF 106 may be generated without delay. This scenario may occur when the sensor or server 180 hosting the ambient information is not active or not accessible at the time that the event took place. ERD 104 may perform one or more actions disclosed in step 716-22 to retrieve the ambient information.

Step 716 executes by entering peer-to-peer mode of operation. ERD 104 may send reminder queries to the sensor or server 180 hosting the ambient information at predetermined time intervals to check on accessibility.

Step 718 executes by entering client-server mode of operation. In this mode, ERD 104 registers request 116 with gateway 122 and has gateway 122 monitor the availability/accessibility of the sensor or server 180. Gateway 122 may send request 116 when the sensor or server 180 becomes accessible on network 100.

Step 720 executes by informing the user that the ambient information is unavailable. The user may be prompted to provide an instruction. Step 722 executes by performing the action specified by the user. For example, the user may enter the ambient information into PNE 102 for ERD 104, or may instruct ERD 104 to forgo collecting ambient information.

Step 724 executes by determining whether the sensor or server 180 is available. Step 724 may be executed in conjunction with steps 716-22 above and done so repeatedly for a specified period of time. If yes, then step 706 executes by sending request 116, as disclosed above. If no, then step 726 executes by marking ambient information field 208 with "ambient information not available." Thus, ERD 104 may generate ERF 106 without the ambient information.

ERD 104 also may collect event participating device information to enter into field event participating device information field 210. Event participating device information may include, using the picture taking example, camera name, make or model, manufacturer, and other relevant information about any devices used. The process to collect this information may follow the event location collecting process disclosed in FIG. 5. The information may be stored in LHD 132 and accessed by ERD 104 for entry into ERF 106 in field 210.

ERD 104 also may collect health information for participant(s) of the event. Health information may be collected from sensors, such as sensors 136, in the same manner as ambient information. Health information may be stored in server 180 from sensors on the patient's body or within the room or vicinity. ERD 104 sends request 116 to collect the health information following the process disclosed in FIG. 7. The health information is stored in ERF 106 within health information field 212.

In addition to the above-disclosed information, ERD 104 may fetch or collect additional information, such as email addresses, IP addresses and the like, to which the picture as data file 110 and ERF 106 is sent. For example, the email addresses of relatives and friends may be used to forward data file 110 and ERF 106 from PNE 102. The IP address could be a digital frame/display/television/computer placed in the living of the grandparents' home, where the latest pictures sent by children are automatically displayed along with the respective ERF without involving the grandparents. Other information collected may be any deemed of interest or valuable to the user.

This miscellaneous information may be collected according to the process disclosed in FIG. 4 or FIG. 6. Once ERD 104 receives the information, ERD 104 stores the information in the appropriate field 214 in ERF 106. As many fields as needed may be used in ERF 106. The disclosed embodiments are not limited to a single field 214.

The processes and steps disclosed above to fill the fields in ERF 106 or the order of the steps may be modified to avoid user annoyance or to offer a better user experience. A user also may add new fields other than the above-disclosed fields in ERF 106. Thus, a user is given whole or partial control/flexibility to organize/manage all or some of the steps disclosed above.

Figure 8:
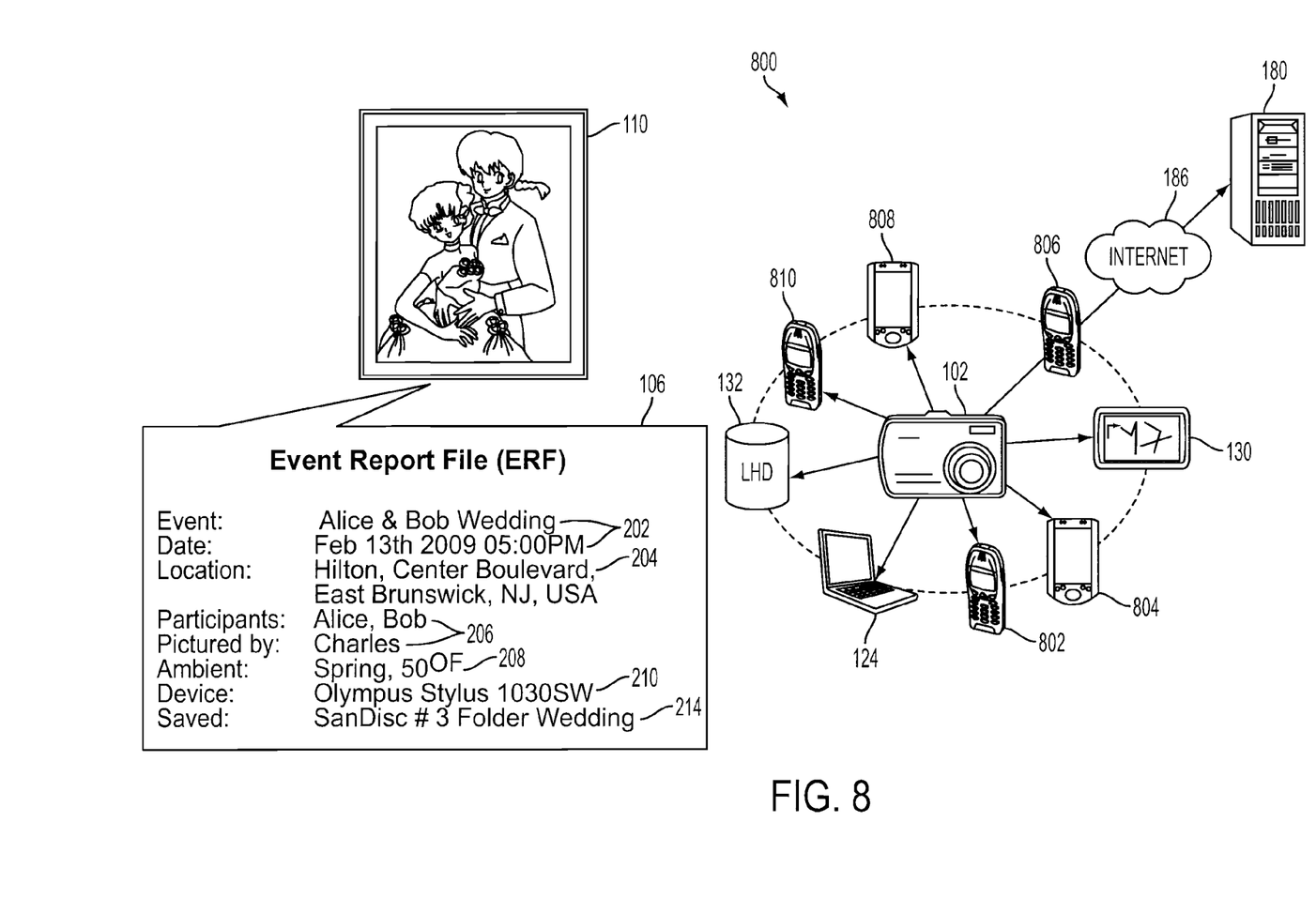
FIG. 8 depicts a converged personal area network service system according to the disclosed embodiments.

FIG. 8 depicts a converged personal area network service system 800 according to the disclosed embodiments. System 800 is similar to network 100 of FIG. 1, except showing a finished ERF 106 and data file 110, which shows a picture taken with PNE 102. PNE 102 in FIG. 8 represents a camera. System 800 also shows other PNEs and their relationship with PNE 102.

System 800 includes GPS 130, LHD 132, PNE 124, internet connection 186 and server 180 from network 100. All these elements are disclosed above, and essentially serve the same functions here. System 800 also includes PNEs 802, 804, 806, 808 and 810. These PNEs include mobile phones, PDAs, and the like.

When the picture for data file 110 is taken, PNE 102 sends requests to the elements shown in system 800. In this instance, ERD 104 resides on PNE 102. Alternatively, ERD 104 may reside on server 180. ERD 104 collects the information shown in fields 202-14 and generates ERF 106.

ERF 106 includes all the fields disclosed above including representative information in each. ERF 106 includes "Alice & Bob Wedding" for event nature information in event nature information field 202. ERF 106 also includes a date and time for the wedding in field 202. ERF 106 stores a location for event location information in event location information field 204. An actual street address also may be shown if desired by the user.

ERF 106 also includes the people in the picture and the person taking the picture in event participant(s) information field 206. ERF 106 also includes weather and temperature as ambient information in ambient information field 208. Preferably, this information is provided by a sensor (not shown). ERF 106 also includes the make and model of PNE 102 in event participating information field 210. Because the health of Bob and Alice are of no interest, health information field 212 is left empty in ERF 106. Miscellaneous information field 214 includes information on where the picture is stored and type of storage.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A converged personal area network service system for a personal area network having a plurality of personal network elements, comprising:
    an event recording device residing within a personal area network configured to collect requested information from at least one of a plurality of personal network elements, that each reside within and communicate over said personal area network;
    an event report file generated by the event recording device using the requested information, wherein the event report file includes fields storing information corresponding to the data file;
    a storage device for the personal area network that stores the data file and the event report file;
    further comprising a location history database external to said event recording device configured to provide event location information based on location coordinates to the event recording device when requested via a request transmitted by said event recording device;
    wherein one of the at least one of said plurality of personal network elements includes a converged address book external to said event recording device configured to provide event participant information to the event recording device when requested via a request transmitted by said event recording device;
    further comprising an electronic calendar application external to said event recording device on one of the at least one of said plurality of personal network elements configured to provide event nature information to the event recording device when requested via a request transmitted by said event recording device; and
    wherein said requests transmitted by said event recording device for said event location information, said event participation information and said event nature information each include a corresponding time stamp, and wherein said system is configured to transmit reminders to said personal network elements to obtain information from said personal network elements in non-real time when said personal network elements are late in becoming available to transmit information to said event recording device and wherein said event recording device is configured to await a period of time before completing said event reporting file.

2. The converged personal area network service system of claim 1, wherein a global positioning satellite system device provides the location coordinates to the location history database.

3. The converged personal area network service system of claim 1, further comprising a sensor for said personal area network configured to provide ambient or health information to the event recording device.

4. The converged personal area network service system of claim 1, wherein the fields of the event report file include at least one of the following: event nature information, event location information, event participant information, ambient information, event participating device information and health information.

5. The converged personal area network service system of claim 1, wherein the storage device is within one of the plurality of personal network elements.

6. The converged personal area network service system of claim 1, wherein the storage device is within a server accessible to one of the plurality of personal network elements.

7. The converged personal area network service system of claim 1, wherein each of said personal network elements is configured to communicate with other personal network elements within said personal area network either directly or indirectly through gateways over a wireless personal area network (WPAN), a wireless local area network (WLAN), or a wide area network (WAN).

8. A method for collecting and storing information for a data file using a personal area network having a plurality of personal network elements within the personal area network, the method comprising:
    performing an action related to an event with an event recording device, wherein the action by the event recording device generates a data file;
    preparing a timestamp corresponding to the event when the action is performed with the event recording device;
    sending a request for information to a plurality of personal network elements within the personal area network from said event recording device within the personal area network, wherein the request includes the timestamp;
    retrieving information corresponding to the timestamp from at least one of the plurality of personal network elements;
    receiving the information at the event recording device;
    generating an event report file by the event recording device, wherein the event report file includes the information in a field;
    storing the event report file and the data file in a storage device for the personal area network;
    wherein the event recording device determines whether a personal network element is accessible prior to performing the sending step;
    wherein at least some of said plurality of personal network elements within said personal area network do not have geographic information but said geographic information is obtained from another of said plurality of personal network elements separate from said event recording device within said personal area network;
    wherein at least some of said plurality of personal network elements within said personal area network also do not have calendar information but said calendar information is obtained from a different another of said plurality of personal network elements separate from said event recording device within said personal area network; and
    further including transmitting reminders to said personal network elements to obtain information from said personal network elements in non-real time when said personal network elements are late in becoming available to transmit information to said event recording device and said event recording device awaiting a period of time before completing said event reporting file.

* * * * *